United States Patent [19]
Callan

[11] 3,724,958
[45] Apr. 3, 1973

[54] SCANNING AND CONTROL APPARATUS

[75] Inventor: John G. Callan, Sharon, Mass.
[73] Assignee: Knox, Inc., South Walpole, Mass.
[22] Filed: Mar. 9, 1970
[21] Appl. No.: 17,735

[52] U.S. Cl. .......................... 356/160, 250/219 TH
[51] Int. Cl. ............................................. G01b 11/10
[58] Field of Search .250/219 TH; 356/156, 159, 160

[56] References Cited

UNITED STATES PATENTS 2,433,557  12/1947  Hurley ................................ 356/159
3,513,321   5/1970  Sherman ........................ 356/160 X

*Primary Examiner*—William L. Sikes
*Assistant Examiner*—F. L. Evans
*Attorney*—Edgar H. Kent

[57] ABSTRACT

Apparatus for measuring differences in a dimension of objects and actuating equipment responsive to a plurality of magnitudes of the dimension employs a plurality of first electrical circuits, each having first and second states of energization and corresponding to a particular magnitude of the dimension, and a plurality of second electrical circuits, respectively corresponding to one of the first circuits and arranged when energized to actuate the equipment in accordance with one of the plurality of magnitudes of the dimension. The second circuit corresponding to a particular magnitude is energized when the corresponding first circuit has its first state of energization and the first circuit corresponding to the next magnitude greater than the particular magnitude has its second state of energization.

5 Claims, 5 Drawing Figures

SCANNING AND CONTROL APPARATUS

This invention relates to scanning and control apparatus for measuring differences in a dimension of a succession of objects and actuating subsequent processing equipment according to different magnitudes of that dimension.

The invention is of general utility where it is necessary to adjust and control processing or handling equipment according to a variable dimension of objects worked upon. A specific example of such utility, selected for describing and illustrating the invention, is scanning logs passing on a bullchain toward bandsaws for controlling the position of the bandsaws as a function of log diameter.

The orientation of a log with respect to the bandsaws which cut the logs, together with the orientation of the bandsaws with respect to each other, determine the total board feet which are obtainable from an individual log. As is well known to those in the lumber industry, more board feet may be cut from a curved log, for example, when the log has been rotated so that the curved portion lies in a vertical, rather than a horizontal, plane. Similarly, there is an optimum configuration in which the saws may be positioned for each log diameter. Existing apparatus for control of bandsaw position requires an attendant who must measure the log diameter manually, after the log has been rotated into its optimum orientation, and activate controls for positioning the bandsaws. Thus, the measuring operation is time consuming and subject to human error, with correspondingly reduced productivity of the mill and excess waste when the logs are cut.

Accordingly, it is an object of the invention to provide a scanner useful for measuring differences in a dimension of variable dimension articles such as log diameter with apparatus that is simple, inexpensive, reliable and easily installed and used.

A further object of the invention is to provide such a scanner which may be employed to give an accurate readout of the dimensions, to record the same and produce a signal to control processing equipment such as bandsaw positions automatically and much more rapidly than is possible with existing apparatus or to produce a signal in response to which an attendant can operate manual controls.

A further object of the invention is to provide such a scanner which discriminates between relatively small increments of the dimension and remains unaffected by changes in ambient illumination levels.

A still further object of the invention is to provide a heavy duty scanner which may be used in exposed (e.g. outdoor) locations and resists deterioration from dirt or damage from contact with other equipment and employees.

According to the invention, apparatus for measuring differences in a dimension of an object and actuating equipment responsive to any of a plurality of magnitudes of that dimension, has a plurality of first electrical circuits, each with first and second states of energization and each arranged to correspond to a particular magnitude of the dimension, to have the first state of energization when the dimension is less than that particular magnitude and have the second state of energization when the dimension is greater than that particular magnitude, and a plurality of second electrical circuits respectively corresponding to one of the first circuits, each with energized and de-energized states and responsive to the states of energization of two of the first circuits, and arranged when energized to actuate the equipment in accordance with one of the plurality of magnitudes of the dimensions. Each of the second circuits corresponds to a particular magnitude of the dimension and is arranged to be energized only when the first circuit corresponding to the same particular magnitude has its second state of energization and the first circuit corresponding to the next magnitude greater than that particular magnitude has its first state of energization.

In preferred embodiments, the apparatus also has a plurality of sensors, respectively corresponding to one of the particular magnitudes and to one of the first circuits; each of the sensors has first and second electrical characteristics and is arranged to discriminate between magnitudes of the dimension of the object greater than and less than the magnitude to which the sensor corresponds, to have the first electrical characteristic when the dimension is less than the magnitude to which the sensor corresponds and to have the second electrical characteristic when the dimension is greater than the particular magnitude to which the sensor corresponds; each of the first circuits is responsive to its corresponding sensor and is arranged to have its first state of energization when the corresponding sensor has its first electrical characteristic and to have its second state of energization when the corresponding sensor has its second electrical characteristic; each of the first circuits has one of the sensors; the first and second electrical characteristics are, respectively, first and second resistances; the apparatus also has a source of light and the sensors are photoelectric cells; the photoelectric cells are disposed in an array in the direction of the dimension to be measured and are arranged to be energized and to display their first resistance when light from the source impinges thereon and to remain de-energized and to display their second resistance in the absence of light from said source impinging thereon; the sensors must be positioned properly with respect to the objects to correspond correctly to a particular magnitude of the dimension and the apparatus includes means for moving the sensors with respect to the object and a third electrical circuit including monitoring means arranged to permit said apparatus to measure differences in the dimension when the sensors are properly positioned with respect to the objects and to prevent said apparatus from measuring differences when the sensors are other than properly positioned with respect to the objects; the monitoring means includes one of the sensors which is arranged to sense the position of the sensors with respect to the objects, to permit the apparatus to measure differences in the dimension when the sensors are properly positioned with respect to the object and to prevent the apparatus from measuring differences in the dimension when the sensors are other than properly positioned with respect to the objects; changes in the ambient illumination level change the adjustment of the sensors in the apparatus from proper adjustment to improper adjustment and the apparatus includes adjusting means arranged to return the sensors from improper adjustment to proper adjustment; the apparatus is arranged for interposing the object between the source and the array of photoelectric cells in the manner that light from the source impinges upon the photocells which correspond to the particular magnitudes of the dimension which are greater than the dimension of the object and that no light from the source impinges upon the photoelectric cells corresponding to the particular magnitudes of the dimension which are less than the dimension of the object; the second resistance is greater than the first resistance.

In another aspect the invention features apparatus, for measuring a dimension of an object and indicating that dimension, which has a plurality of sensors each corresponding to one of a plurality of particular magnitudes of that dimension and with energized and de-energized states, a plurality of indicators, each corresponding to one of the particular magnitudes of the dimension and each arranged to be energized and de-energized by the sensor corresponding to the same particular magnitude of the dimension, and a plurality of electrical circuits, each corresponding to one of the particular magnitudes of the dimension and including the sensor and indicator corresponding to the same particular magnitude of the dimension. Each of the sensors is arranged to sense the dimension of the object and to have its energized state when the dimension is less than the particular magnitude of the dimension to which the sensor corresponds and to have its de-energized state when the dimension is greater than the particular magnitude of the dimension to which the sensor corresponds; each of the indicators is arranged to be energized and to indicate the particular dimension to which the indicator corresponds when the sensor corresponding to that indicator is de-energized and to be de-energized when the sensor corresponding to that indicator is energized.

In preferred embodiments the apparatus has a light source and the sensors are photoelectric cells; each photoelectric cell has a first electrical characteristic when the photoelectric cell is energized and a second electrical characteristic when the photoelectric cell is de-energized; the photoelectric cells are arranged to define an array of photoelectric cells in the direction of the dimension and to be energized when light from the source impinges on the photoelectric cell and remain de-energized in the absence of light from the source impinging on the photoelectric cell; the apparatus is arranged for interposing the object between the source and the array of photoelectric cells in the manner that light from the source impinges upon the photoelectric cells which correspond to the particular magnitudes of the dimension which are greater than the dimension and that no light from the source impinges upon the photoelectric cells corresponding to particular magnitudes of the dimension which are less than the dimension; and the first and second electrical characteristics are, respectively, first and second resistances and the second resistance is greater than the first resistance.

Other objects, features and advantages will become apparent from the following description of a preferred embodiment of the invention and a particular application thereof to scanning log diameter, taken together with the attached drawings thereof in which.

Figure 1:
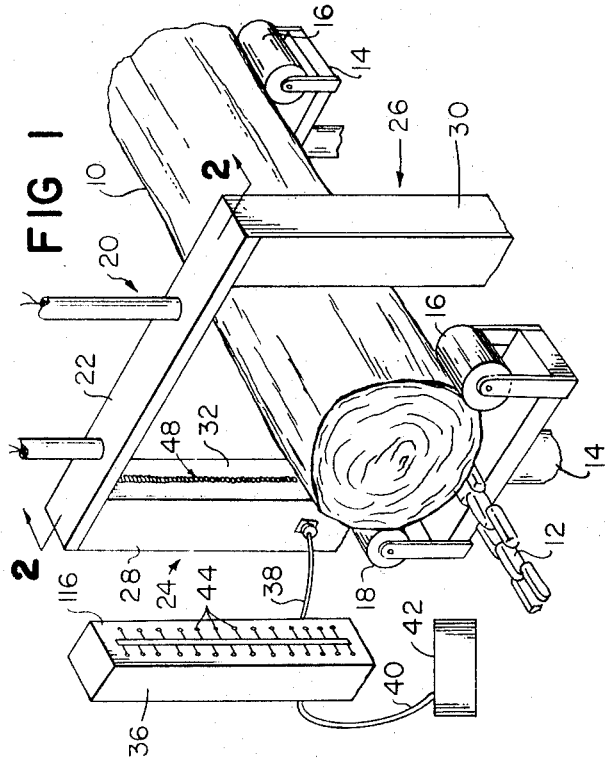
FIG. 1 is a perspective view showing the scanner and a log diameter readout column as a log begins to pass through the scanner.

Referring to FIG. 1, a log 10, is carried on bullchain 12 to a log inspection station having a pair of hydraulic hoists 14, each with two hydraulically powered rollers 16 and 18. Bullchain 12, hoists 14 and rollers 16 and 18 are provided with conventional manually operated push button control. Hoists 14 are arranged to lift log 10 vertically after bullchain 12 has stopped and rollers 16 and 18 are arranged to rotate log 10 into the optimum position for sawing in a manner well known in the lumber industry. A hydraulically operated push button actuated U-shaped yoke 20 including a horizontal support frame 22 which is arranged to be moved vertically and to support vertically extending scanner housing columns 24 and 26, respectively having steel enclosures 28 and 30 and plexiglass windows 32 and 34 facing each other, on opposite sides of log 10, is disposed above log 10. Diameter readout column 36 is connected to scanner column 24 by leads 38 and by leads 40 to programmed controls 42 for positioning the bandsaws and has a plurality of indicating lamps 44 arranged to be energized by circuitry (to be discussed below) in scanner column 24 and to indicate log diameter.

Figure 3:
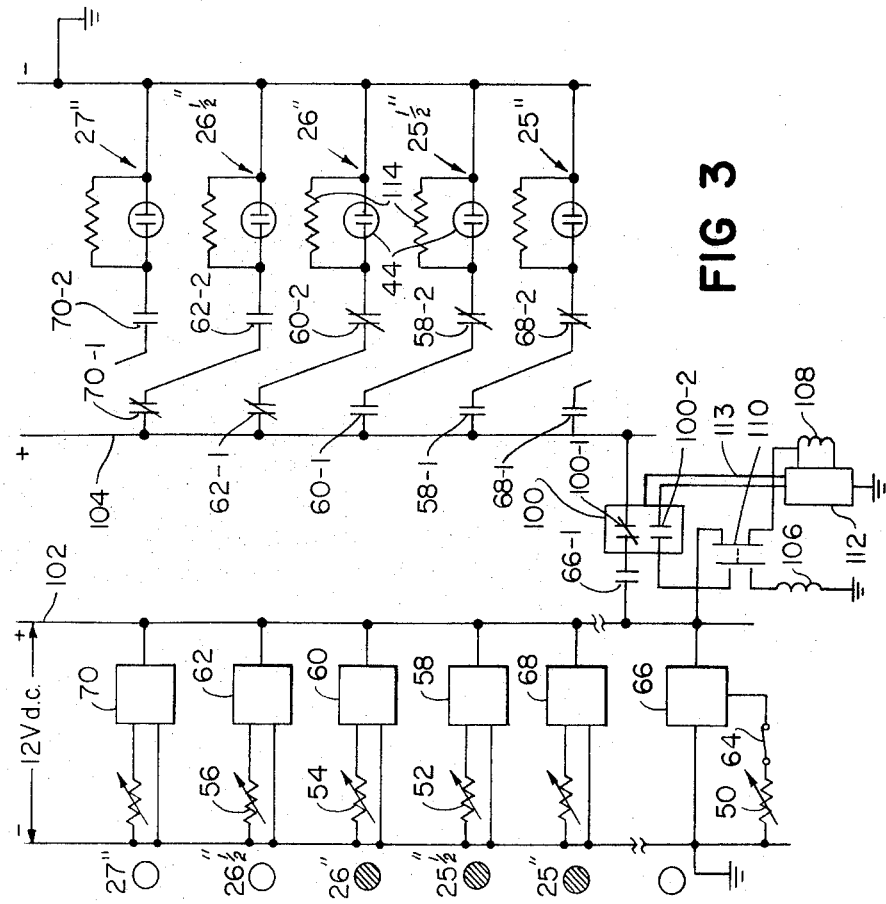
FIG. 3 is an electrical schematic wiring diagram, after the upper two photoelectric cells shown have been energized, showing a portion of the scanner and control circuitry for controlling the position of bandsaws, together with a diagrammatic representation of the photoelectric cells and log diameters to which the circuits correspond.
Figure 2:
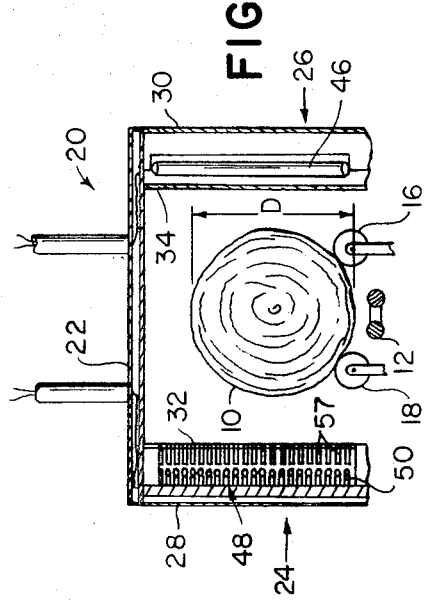
FIG. 2 is a cross-sectional view taken along line 2—2 of FIG. 1.

Light source housing 26 has mounted therein (FIG. 2) at least one fluorescent lamp 46 arranged to radiate light through window 34 in the direction of window 32. 61 photoelectric cells (or "photocells"), generally designated 48 (of which four photocells 50, 52, 54 and 56 are designated in the circuitry of FIG. 3), are mounted in a vertical configuration and spaced one-half inch apart at the end of tubes 57 behind window 32 and are each arranged to be energized by light radiating from lamp 46 which impinges on photocells 48, in the absence of a log between lamp 46 and the particular photocell 48. Tubes 57 are arranged to prevent changes in ambient light from energizing the photocells 48.

Photocells 48 are shown spaced one-half inch from each other, although the spacing between the photocells may be varied according to the requirements of the particular installation.

With one exception, each photocell 48 is connected with a plug-in module only to define a Schmitt trigger circuit (to be discussed in greater detail below) between a 12 volt d.c. source which is applied across each photocell and its corresponding module.

The bottom photocell in scanner housing 24 is monitor cell 50. Photocells 52, 54 and 56 are located, respectively, 25½ inches, 26 inches and 26½ inches above monitor cell 50.

As is shown in FIG. 3 photocell 52 is connected to module 58. Similarly, photocell 54 is connected to module 60 and photocell 56 is connected to module 62. Monitor cell 50 is connected in series with a normally open limit switch 64, which is mechanically actuated and arranged to be closed when yoke 20 approaches the bottom limit of its vertical descent, and is connected to module circuit 66 between the 12 volt d.c. source and ground.

For purposes of illustration, the module corresponding to the photocell 48 at a height of 25 inches above monitor cell 50 is designated module 68 and the module corresponding to the photocell 48 at a height of 27 inches above monitor cell 50 is designated module 70.

Figure 4:
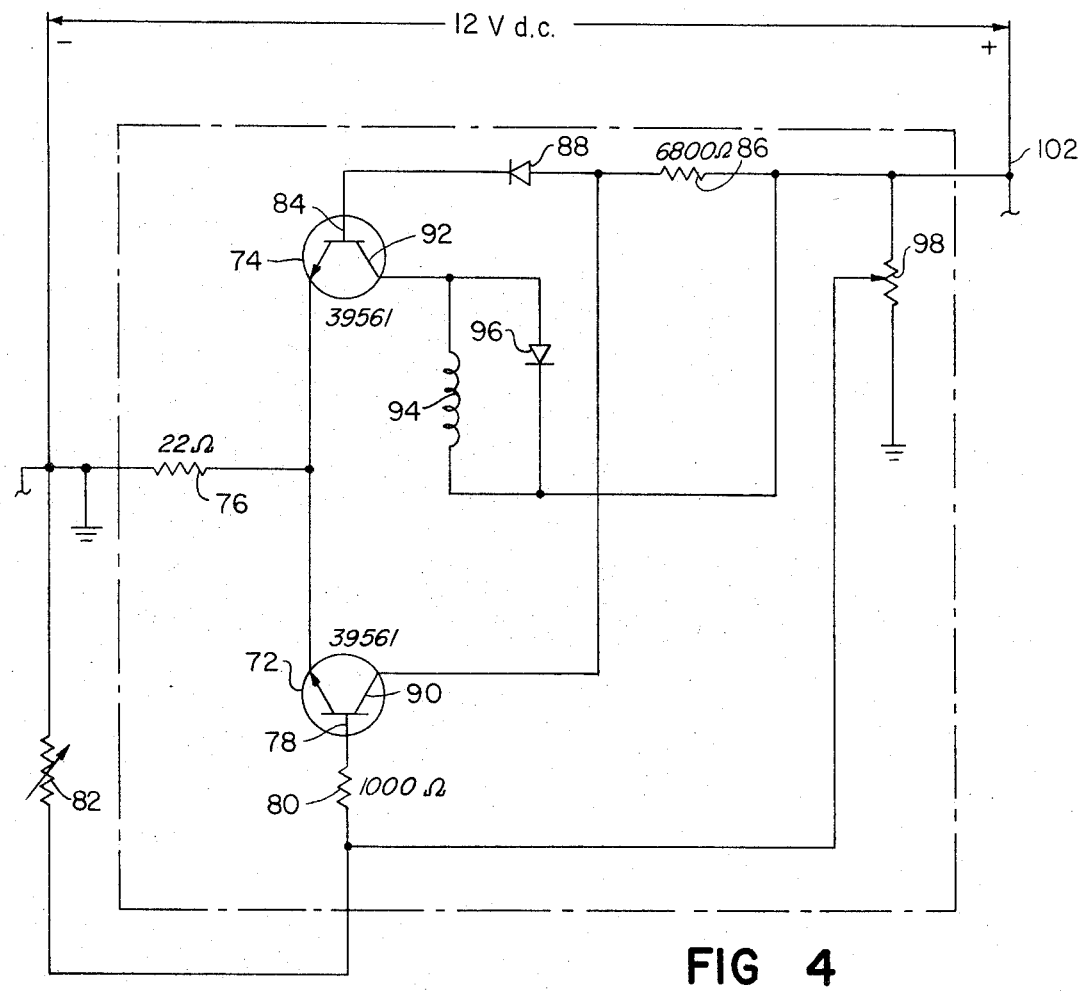
FIG. 4 is an electrical schematic wiring diagram, showing the typical internal wiring of a module connected to a photocell across a 12 volt d.c. source.

A typical photocell-module circuit is shown in FIG. 4. NPN transistors 72 and 74 have their emitters connected to ground through 22 ohm common-emitter resistor 76. Base 78 of transistor 72 is connected to ground through 1,000 ohm resistor 80 and photocell 82 and defines the input to a Schmitt trigger circuit. Base 84 of transistor 74 is connected to the 12 volt d.c. source through 6,800 ohm resistor 86 and diode 88. The 12 volt d.c. source is also connected to collector 90 of transistor 72 through resistor 86. Collector 92 of transistor 74 is the output of the trigger circuit and is connected to the 12 volt d.c. source through a relay coil 94, connected in parallel with blocking diode 96. Potentiometer 98 is connected between the 12 volt source and ground to the junction between resistor 80 and photocell 82 and is arranged to provide adjustment of the base voltage of transistor 72 and therefore of the change in input voltage required to turn transistor 72 off and on.

As is well known, a Schmitt trigger circuit is a switching circuit which has a fast switching time. When the base voltage of transistor 72 decreases sufficiently, transistor 72 is turned off and transistor 74 switches on. Current flow is then through relay 94, transistor 74 and resistor 76. Potentiometer 98 and photocell 82 form a voltage divider which is arranged to control the base voltage of transistor 72. Photocell 82 has a much larger resistance when it is de-energized than when it is energized and thus, when de-energized is arranged to maintain the voltage at base 78 at a sufficiently high valve to keep transistor 72 on and, when energized, is arranged to permit the voltage at base 78 to drop sufficiently to switch transistor 72 off and to switch transistor 74 on and therefore to energize coil 94.

The relay in module 66 (FIG. 3) has a normally open contact pair 66-1 wired in series with normally closed contact pair 100-1 (in timing circuit 100) between the positive bus 102 for the photocell-module circuits and a second positive bus 104. Timing circuit 100 also has a normally open contact pair 100-2 and is arranged to open contact pair 11-1 and to close contact pair 100-2, through conventional switching means, 0.020 seconds after circuit 100 has received a pulse through contact pair 66-1, which is arranged to be closed when limit switch 64 has been closed, monitor cell 50 (and, therefore, the coil in module 66) have become energized.

Movement of yoke 20 is controlled by DOWN valve solenoid 106 and UP valve solenoid 108 which are arranged to control the position of a valve which in turn operates a hydraulic motor which moves yoke 20. DOWN solenoid 106 is energized from bus 102 by manual operation of START CYCLE switch 110. Operation of UP solenoid 108 is controlled by switch 110, reversing relay 112, which includes a silicon controlled rectifier (SCR), and normally open contact pair 100-2. The SCR is arranged to prevent current from flowing in solenoid 108 when the SCR is switched off. When switch 110 is pushed to energize solenoid 106, the SCR in reversing relay 112 is turned off and remains off, even after switch 110 is returned to its original position, until contact pair 100-2 closes to switch the SCR on, permitting current to energize solenoid 108. Switch 110 when pushed to energize solenoid 106, is further arranged to release, through reversing relay 112 and over line 113, timing circuit 100 and to return contact pairs 100-1 and 100-2 to their initial positions.

Each relay in a module (other than the relay in module 66), in addition to its corresponding coil, has one normally open contact pair and one normally closed contact pair arranged to change position, respectively, from open to closed and from closed to open when current sufficient to energize the corresponding coil passes therethrough. For simplicity of explanation, in FIG. 3 the normally open contact pair on each relay is designated by the reference numeral of the module in which the relay is located followed by —1 and the normally closed contact pair designated by the same numeral followed by —2. For example, the contact pairs on the relay in module 58 are normally open contact pair 58-1 and normally closed contact pair 58-2. The normally open contact pair corresponding to each module is connected in series with the normally closed contact pair corresponding to the module connected to the photocell which is located one-half inch below the photocell connected to the first-mentioned module. For example, normally open contact pair 58-1 (module 58 corresponds to a height of 25 ½ inches above monitor cell 50) is connected in series with normally closed contact pair 68-2 (module 68 corresponds to a height of 25 inches above monitor cell 50) and normally closed contact pair 58-2 is connected in series with normally open contact pair 60-1 (module 60 corresponds to a height of 26 inches above module 50).

Each series-connected set of contact pairs, for example, pairs 60-1 and 58-2, is connected in series, between bus 104 and ground, with a different load 114, each corresponding to a different photocell 48, each of which is arranged to actuate programmed controls 42 to position the bandsaws in accordance with the height above monitor cell 50 at which that photocell 48 is located, and each of which is shunted by an indicating lamp 44. As is illustrated in FIG. 3, (and will be explained more fully below) only one load 114 and one lamp 44, if any, may be energized at one time and the load 114 and lamp 44 which are energized correspond to the highest photocell 48 above monitor cell 50 which is not energized.

Lamps 44 are arranged in two groups with those which correspond to photocells 48 at heights, above monitor cell 50, expressed in whole inches displayed on the right hand side of the face 116 of readout column 36 and those which correspond to photocells 48 at heights expressed in non-integral inches (i.e., in terms of half inches) above monitor cell 50 displayed on the left hand side of face 116 to provide ease in visual observation of the indication of log diameter D.

In operation log 10 is carried on bullchain 12 until the log is positioned over hydraulic hoists 14. An attendant actuates the hoists, which lift the log off bullchain 12, and rollers 16 and 18 which turn log 10 to the optimum position for cutting. The attendant then lowers yoke 20 toward log 10 by depressing push-button switch 110 to energize solenoid 106. Although light from source 46 impinges on photocells 48 before the photocells pass downwardly on the opposite side of log 10 from source 46, none of the loads 114 is energized since limit switch 64 remains open and, therefore, contact pair 66–1 remains open and bus 104 remains de-energized. After monitor cell 50 has descended a distance corresponding to the minimum diameter log which may be received, the magnitude of which may vary with different installations, limit switch 64 closes. Yoke 20 continues to move downwardly until monitor cell 50 passes below the lower surface of the log and is energized by light from lamp 46 and switch 112 is returned to its initial position. When monitor cell 50 is energized, its resistance decreases, module 66 switches its conducting state, and relay coil 66 is energized closing contact pair 66–1 to apply the 12 volt d.c. source to bus 104. Log 10 blocks a portion of the light emitted from lamp 46 and prevents all lamps 48 less than D inches (the log diameter) above monitor cell 50 from becoming energized, while all photocells 48 located more than D inches above monitor cell 50 are energized by light emitted from lamp 46. Tubes 57 generally prevent the photocells 48 at a height less than D inches (which, for the purposes of illustration, is assumed to be 26 ¼ inches) above monitor cell 50 from becoming energized either by light from lamp 46 or by changes in the ambient light level. As shown in FIG. 3, the position of those contact pairs on the coils which correspond to photocells 48 at a height less than 26 ¼ inches above monitor cell 50 remain unchanged and all loads 114 and lamps 44 which correspond to lesser diameters than 26 inches (heights less than 26 inches above monitor cell 50) remain de-energized.

Thus, modules 58 and 68 remain in their initial conducting state, the positions of the corresponding contact pairs 58–1, 52–2, 68–1 and 68–2 remain unchanged and the corresponding lamps 44 and loads 114 remain de-energized. Modules 62 and 70 switch their conducting states and the positions of the corresponding contact pairs 62–1, 62–2, 70–1 and 70–2 are changed. Module 60 remains in its initial conducting state and the positions of contact pairs 60–1 and 60–2 remain unchanged. The load 114 and light 44 corresponding to 26 ½ inches remain de-energized, since although contact pair 70–1 is now closed, contact pair 62–2 is open. Similarly all lamp and indicating light circuits corresponding to heights greater than 26 ½ inches remain de-energized since the normally closed contact pair therein has opened. The lamp 44 and load 114 corresponding to 26 inches become energized, however, since contact pair 60–2 remains closed and contact pair 62–1 has become closed, lamp 44 indicates a log diameter of 26 inches on face 116 of readout column 36 and controls 42 are actuated by current in load 114 to position the bandsaws, for example through conventional electrically actuated hydraulic means, to make optimum cuts for a log with a 26 inches diameter.

Approximately 0.02 seconds after contact pair 66–1 has closed, timing circuit 100 switches the positions of its contact pairs. Contact pair 100–1 opens and bus 104 is deenergized. Contact pair 100–2 closes, switches the SCR in reversing relay 112 on, current flows in UP solenoid 108 and the valve position changes to drive the hydraulic motor to move the yoke 20 upwardly to its starting position. Monitor cell 50 moves upwardly above the lower surface of log 10 and becomes de-energized. Relay 66 is then de-energized and contact pair 66–1 opens. Limit switch 64 opens before monitor cell 50 moves above the upper surface of log 10 and the yoke 20 returns to its initial position. Hoists 14 are lowered and the log is carried by the bullchain 12 to the saws where it is cut.

When the next log is in place on hoists 14 to be measured and switch 110 is pushed, timing circuit 100 and reversing relay 112 are released, contact pairs 100–1 and 100–2 return to their initial positions and solenoid 106 becomes energized to move yoke 20 downward.

In some installations extremely strong ambient light faces the scanner and can have some effect on the height measurement—generally unidirectional with respect to an individual or group of photocells—of the control. When adjustment is required for individual photocells 48, the respective potentiometers 98 in the corresponding module—and therefore the base voltage of transistor 72—may be adjusted so that the decrease in resistance of the photocell is insufficient to switch the conducting state of the module unless the particular photocell is located above the upper surface of log 10. Where greater adjustment is desired, additional monitor cells may be provided below photocells 48 so that the reference point may be shifted up or down depending upon the particular operating conditions, and final adjustments then made by means of the potentiometers.

Figure 5:
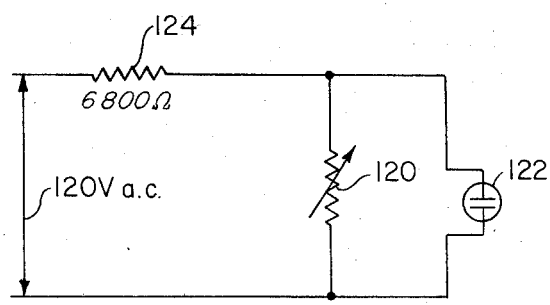
FIG. 5 is an electrical schematic wiring diagram of a portion of the scanner and readout circuitry of an alternate embodiment of the invention.

A portion of the circuitry of an alternate embodiment of the invention, which provides automatic measuring and readout only, is shown in FIG. 5. In this embodiment each photocell 120 is connected in shunt with the corresponding lamp 122 and a 120 volt a.c. source is applied through a 6,800 ohm resistor 124. Lamps 122 are mounted in a single vertical column on a readout column (not shown).

When photocell 120 is energized, its resistance is substantially smaller than the resistance of lamp 122, substantially all of the current which flows through resistor 124 passes through photocell 120, and the current which flows through lamp 122 is insufficient to energize lamp 122. When photocell 120 is deenergized, its resistance is much greater than the resistance of lamp 122, substantially all of the current flowing through resistor 124 passes through lamp 122, and lamp 122 becomes energized.

When a log 10 passes between lamp 46 and photocells 120, only those photocells 120 at a height greater than D inches above the monitor cell are energized, while all those at a height less than D inches above the monitor cell remain de-energized. Thus, a continuous column of lamps 122, up to that lamp 122 which indicates a diameter of less than one-half inch under D is illuminated. The indicated diameter is read by an attendant who then manually actuates controls for positioning the bandsaws.

In the log cutting operation described, the presence of a human attendant is required since the bullchain must be stopped when the log is in position above the hoists, the hoists and rollers must be activated, and the optimum log orientation determined by visual observation. Furthermore, since the location of the bottom surface of a log, after it has been lifted on the hoists, varies, depending upon the log diameter, the height at which the monitor cell should be energized varies accordingly. Thus, in the first-described embodiment provision was made for raising and lowering the apparatus by means of a manually operated push-button which conveniently may be located near the attendant. It will be realized, however, that in many applications the apparatus may, because of their particular requirements, not require a human attendant and that therefore, pushbutton actuation will not be necessary. Thus, a timer, for example, may be employed to actuate the apparatus automatically. Furthermore, for many operations the apparatus need not be movable, and thus may be supported by a stationary surface, may not require a monitor cell, and may be operated continuously or at preselected intervals either automatically or by a human attendant.

What is claimed is:

1. Apparatus for measuring the distance between opposed surfaces of a succession of objects in which said distance is a variable and for producing signals indicating the respective values of such measurements, said apparatus comprising:
   a measuring station to and from which said objects are successively moved;
   a row of spaced photoelectric cells at one side of said station, said row being parallel to and of greater length than the distance to be measured;
   a source of light at the opposite side of said station arranged to impinge on said cells in the absence of a said object at said station and to be blocked off by the presence of a said object at said station from those cells which the said object, between its said opposed surfaces, is opposite;
   said cells being placed in two different conditions by the presence and absence respectively of light from said source impinging thereon;
   a plurality of first electrical circuits each coupled to one of said cells and responsive to one only of said different conditions of the cell coupled thereto to provide a predetermined electrical output; and
   a plurality of second electrical circuits each having therein control means connected to a successive pair of said first circuits and responsive only to a said predetermined electrical output from one of said pair of first electrical circuits connected thereto and the absence of such an output from the other circuit of said pair to provide a said signal from the second electrical circuit controlled thereby.

2. Apparatus according to claim 1 which includes control means connected to said second plurality of circuits and to equipment for operating on said succession of objects for differently adjusting said equipment according to which of said second plurality of circuits produces said signal.

3. Apparatus according to claim 1 which comprises a conveyor for moving said objects to and from said measuring station.

4. Apparatus according to claim 1 which includes:
   means for adjustably moving said cells and light source relative to an object at said station to a position wherein said object does not block the light from said source from at least one cell at each end of said row;
   detector means to detect the arrival of said cells in said position; and
   means under the control of said detector means for preventing measuring operation of said cells and circuits until such arrival is detected by said detector means.

5. Apparatus according to claim 1 wherein said cells have resistances therein coupled to the respective circuit of said first plurality of circuits, the electrical resistance of each resistance being different when light from said source is blocked from its cell than when it is not, said different resistances constituting said two different conditions of said cells.

* * * * *